(12) United States Patent
Nakaya

(10) Patent No.: US 11,643,091 B2
(45) Date of Patent: May 9, 2023

(54) IN-VEHICLE EQUIPMENT CONTROL DEVICE

(71) Applicant: Mazda Motor Corporation, Hiroshima (JP)

(72) Inventor: Yusuke Nakaya, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 266 days.

(21) Appl. No.: 17/160,374

(22) Filed: Jan. 28, 2021

(65) Prior Publication Data
US 2021/0269047 A1 Sep. 2, 2021

(30) Foreign Application Priority Data

Feb. 27, 2020 (JP) .............................. JP2020-032215

(51) Int. Cl.
| | |
|---|---|
| *B60W 50/00* | (2006.01) |
| *B60R 16/023* | (2006.01) |
| *B60R 25/24* | (2013.01) |
| *H04L 67/12* | (2022.01) |

(52) U.S. Cl.
CPC ......... *B60W 50/00* (2013.01); *B60R 16/0231* (2013.01); *B60R 25/24* (2013.01); *H04L 67/12* (2013.01); *B60W 2050/0052* (2013.01)

(58) Field of Classification Search
CPC .................................................. B60W 50/00
See application file for complete search history.

(56) References Cited

U.S. PATENT DOCUMENTS

| | | | |
|---|---|---|---|
| 6,445,989 B2 * | 9/2002 | Nishimura | F02D 41/266 701/34.3 |
| 7,596,636 B2 * | 9/2009 | Gormley | B60R 16/0231 710/15 |
| 8,966,443 B2 * | 2/2015 | Morgan | G06F 9/44521 717/120 |
| 10,427,692 B2 * | 10/2019 | Addison | G06F 8/60 |
| 2012/0159436 A1 | 6/2012 | Morgan et al. | |
| 2021/0268973 A1 * | 9/2021 | Nakaya | B60R 16/037 |
| 2021/0273824 A1 * | 9/2021 | Nakaya | G06F 9/4411 |
| 2021/0273997 A1 * | 9/2021 | Nakaya | H04L 12/40 |

FOREIGN PATENT DOCUMENTS

JP 2012-133786 A 7/2012

* cited by examiner

*Primary Examiner* — Michael A Berns
(74) *Attorney, Agent, or Firm* — Xsensus LLP

(57) ABSTRACT

To reduce the man-hours of software development when vehicle types are deployed, an in-vehicle equipment control device has a control unit that outputs, to actuators, control signals based on the outputs from sensor devices. The control unit includes a middleware layer and a device driver layer as software components. The middleware layer includes a routing module that selects whether the communication data output from the sensor devices is output as is or the communication data is subjected to predetermined processing and then output according to the type of the communication data, and a treatment module that performs the predetermined processing on the communication data. The routing module has a function of outputting the communication data to the device driver.

17 Claims, 4 Drawing Sheets

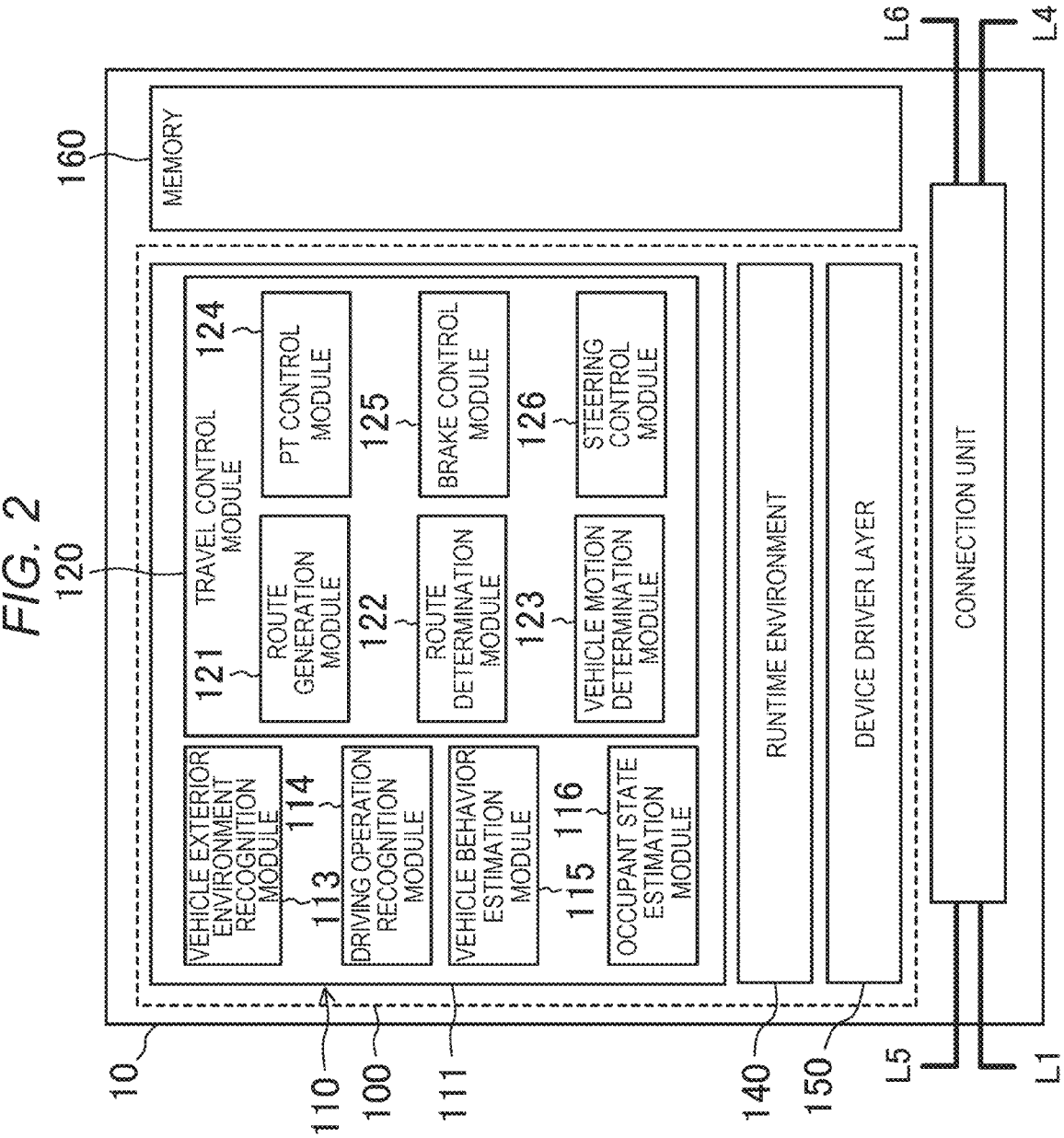

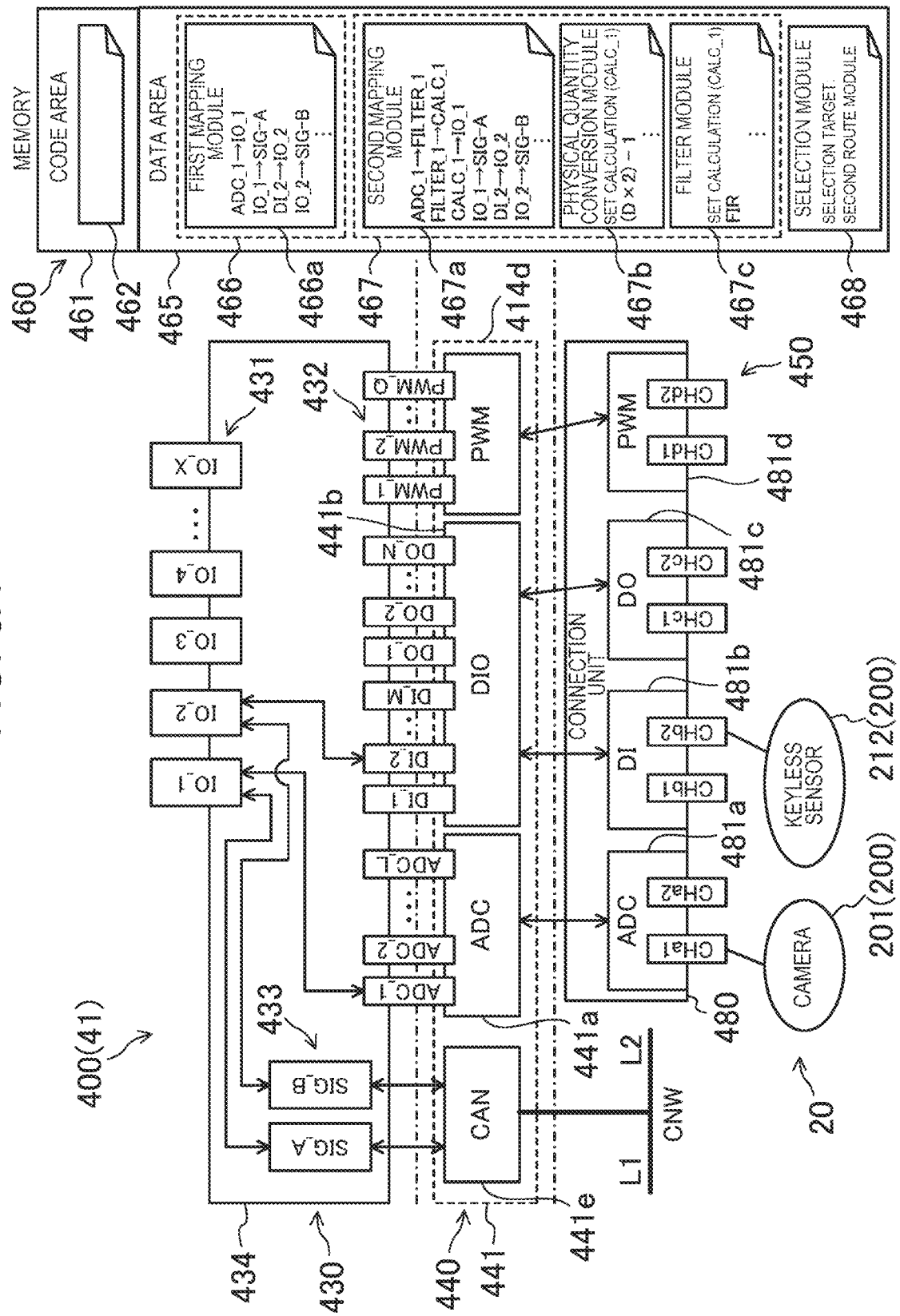

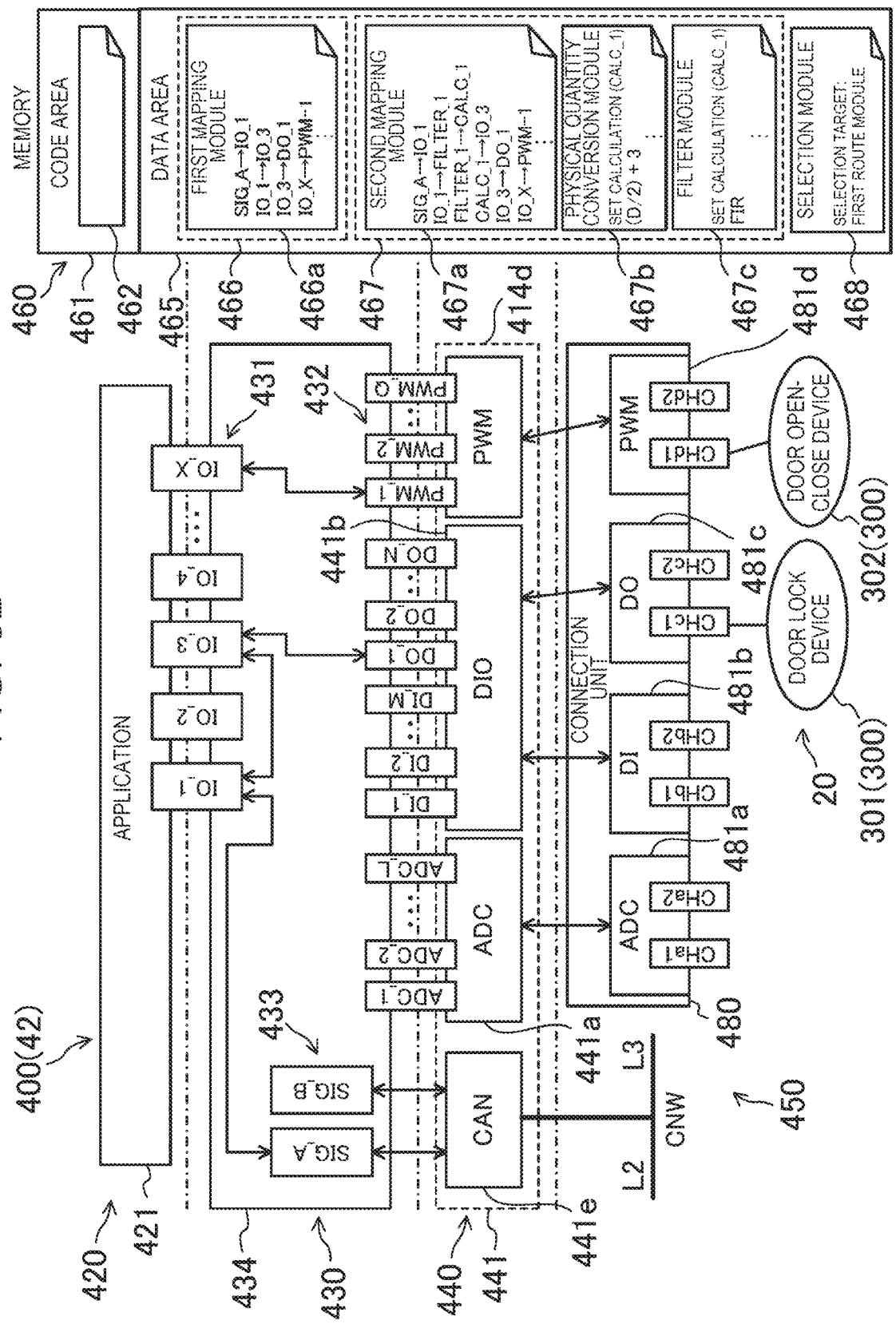

IN-VEHICLE EQUIPMENT CONTROL DEVICE

CROSS-REFERENCE TO RELATED APPLICATION

This application claims priority from Japanese Application No. 2020-032215, filed on Feb. 27, 2020, the contents of which are incorporated by reference herein in its entirety.

TECHNICAL FIELD

The technology disclosed herein relates to a technical field concerning in-vehicle equipment control devices.

BACKGROUND

In recent years, autonomous driving systems have been developed nationally and almost all actuators installed in vehicles have been electronically controlled. Control devices that control these actuators often have a software configuration compliant with the AUTOSAR (automotive open system architecture) standard.

For example, patent document 1 discloses a method that concerns an AUTOSAR software system having a plurality of AUTOSAR software elements connected via a runtime environment of and bypasses the AUTOSAR software elements.

PATENT DOCUMENTS

[Patent document 1] JP-A-2012-133786

SUMMARY

Problem to be Solved

By the way, in a hierarchical software architecture such as AUTOSAR, an application calls an API (application programming interface) provided by a device driver for each peripheral and exchanges data with individual I/Os.

Here, a case is assumed in which, for example, a certain ECU (referred to as a first ECU) transfers the communication data received from a sensor or switch via an I/O to operate an actuator connected to an I/O of another ECU (referred to as a second ECU) in an in-vehicle network. In the previous technology, for example, when the communication data received from the sensor in the first ECU is transferred to the second ECU via the in-vehicle network, a program that uses an API (application programming interface) for exchanging this data needs to be created. In addition, in the second ECU, when the communication data received from the first ECU is sent to the actuator via the in-vehicle network, a program that uses an API for outputting this data needs to be created.

Since a lot of in-vehicle equipment needs to be installed in a vehicle, when programs that use such APIs for connection are created for the in-vehicle equipment (including sensors, switches, and actuators), the man-hours of software development increase. Furthermore, for example, when the port to which a device is connected changes or when the signal form of an I/O of the device or the mode of information to be exchanged changes, since the source code of the application concerning an API call of the application needs to be changed, the man-hours of software development also increase.

The technology disclosed herein addresses these points with an object of reducing the man-hours of software development.

To solve the above problems, according to the technology disclosed herein, there is provided an in-vehicle equipment control device for a vehicle having a plurality of sensors and a plurality of devices, the in-vehicle equipment control device including a control unit configured to receive outputs from the sensors and output control signals based on the outputs from the sensors to the devices, in which the control unit includes, as software components, a device driver layer having a hardware abstraction function and a device driver thereof, and a middleware layer provided above the device driver layer, in which the middleware layer includes a routing module that selects whether communication data output from the sensors is output as is or the communication data is subjected to predetermined processing and then output according to a type of the communication data, and a treatment module that performs the predetermined processing on the communication data, and in which the routing module has a function of outputting the communication data to the device driver.

According to the aspect, the routing module and the treatment module that centrally define the treatment and exchange of the data of the sensors are provided in the middleware layer. Accordingly, the API function program for data exchange does not need to be provided for each application and the man-hours of software development can be significantly reduced.

The in-vehicle equipment control device further includes a central controller configured to centrally control a plurality of control units provided in the vehicle, the control unit being one of the plurality of control units, in which the routing module is capable of selecting a communication route through which the communication data is output to the devices without being sent to the central controller.

According to the aspect, the processing can be fully completed between the control units without intervention of the central controller. This can reduce the processing load on the central controller. In addition, since the amount of data transmitted between the central controller and the control units can be reduced, the communication congestion can be relieved.

The disclosure describes various advantages. For example, as described above, according to the technology disclosed herein, the processing speed of the in-vehicle equipment control device can be improved. In addition, the man-hours of software development can be significantly reduced.

BRIEF DESCRIPTION OF THE DRAWINGS

FIG. 2 is a diagram illustrating a structural example of a central controller.

FIG. 3A is a diagram illustrating a structural example of an in-vehicle equipment control device.

FIG. 3B is a diagram illustrating a structural example of the in-vehicle equipment control device.

DETAILED DESCRIPTION

Figure 1:
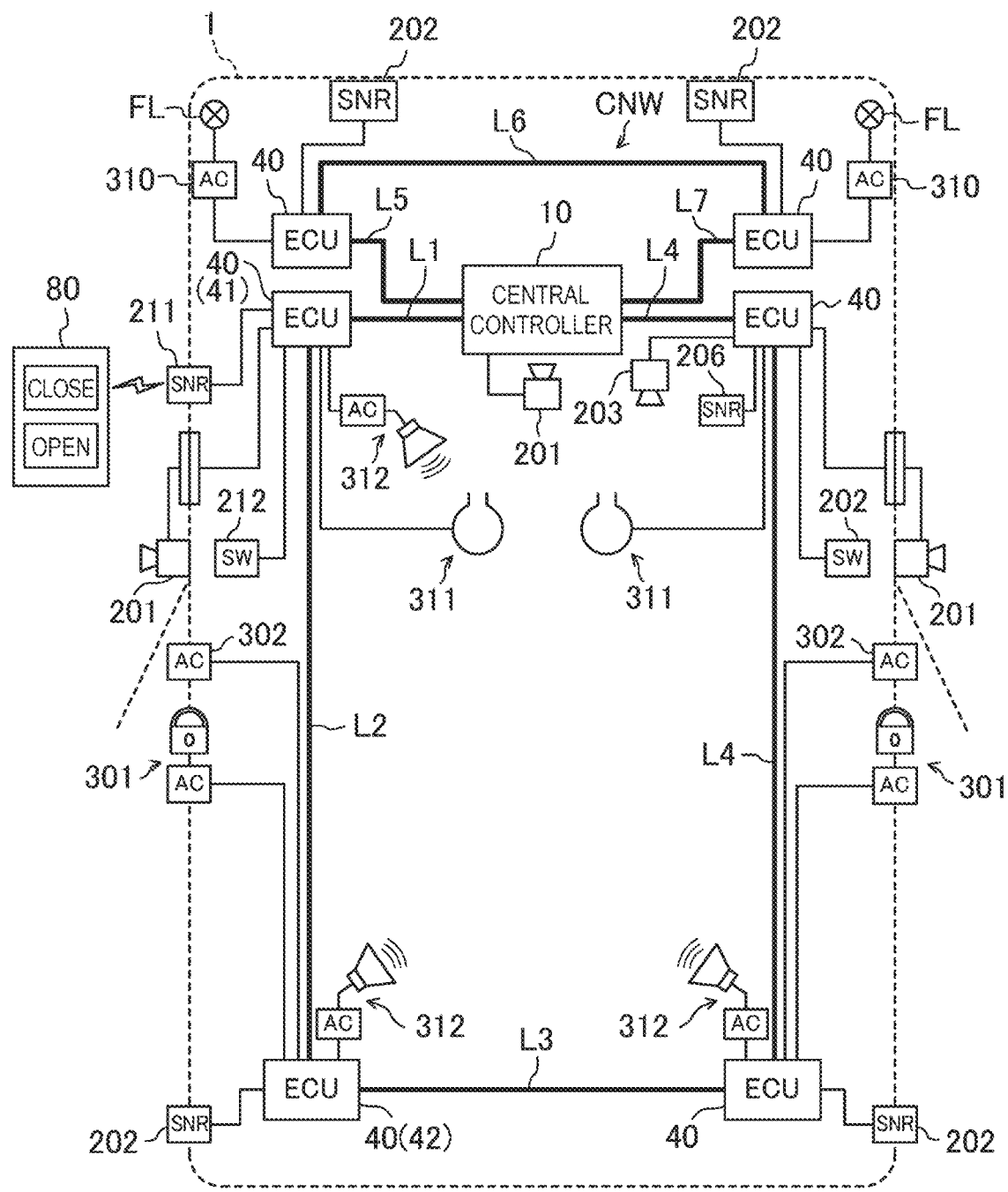
FIG. 1 is a diagram illustrating a structural example of a vehicle control system.

An exemplary embodiment will be described in detail below with reference to the drawings.

(Vehicle Control System)

FIG. 1 is a diagram illustrating a structural example of a vehicle control system. The vehicle control system in FIG. 1 is installed in the vehicle 1 and includes a plurality of zone ECUs 40 and a central controller 10 that centrally controls the plurality of zone ECUs 40.

The zone ECU 40 is configured so that in-vehicle equipment 20 disposed in the same zone as in the zone ECU 40 can be connected thereto. In addition, the zone ECU 40 has a function as a network hub device that relays information sent via an in-vehicle network (referred to below as an in-vehicle network CNW).

The in-vehicle network CNW is a ring-shaped network. The communication system of the in-vehicle network CNW is not particularly limited. In the following, it is assumed that the in-vehicle network CNW is the network (simply referred to below as the CAN) compliant with the CAN (controller area network) communication protocol. The in-vehicle network CNW may be compliant with another communication system such as the Ethernet (registered trademark) protocol. In the following description, CAN buses constituting the in-vehicle network CNW are denoted by symbol L. In addition, for convenience of description, symbol L is followed by a number (1 to 7). When CAN buses are not particularly distinguished, they may be simply referred to as the CAN bus L.

The plurality of zone ECUs 40 define a plurality of zones in the vehicle 1 and one zone ECU 40 is disposed for each of the zones. In the embodiment, the vehicle 1 is divided into six zones and one zone ECU 40 is provided for each zone. In the following, for convenience of explanation, the zone ECU 40 disposed in the left-side zone on the left side of the vehicle 1 may be referred to as a first zone ECU 41 and the zone ECU 40 disposed in the left rear zone on the left rear side of the vehicle 1 may be referred to as the second zone ECU 42. The first zone ECU 41 and the second zone ECU 42 are connected to each other by a CAN bus L2.

<In-Vehicle Equipment>

The in-vehicle equipment 20 includes actuators 300 and input equipment having sensor devices 200 and signal receiving devices. The sensor devices 200 are examples of sensors and the actuators 300 are examples of devices.

<Sensor Devices and Signal Receiving Devices>

The sensor devices 200 include, for example, (1) a plurality of cameras 201, provided on the body or the like of the vehicle 1, that capture the environment outside the vehicle, (2) a plurality of radars 202, provided on the body or the like of the vehicle 1, that detect targets and the like outside the vehicle, (3) a position sensor (not illustrated) that detects the position (vehicle position information) of the vehicle 1 using the GPS (Global Positioning System), (4) vehicle state sensors (not illustrated), including a vehicle speed sensor, an acceleration sensor, a yaw rate sensor, and the like for detecting the behavior of the vehicle, that obtain the state of the vehicle 1, (5) an occupant state sensor 203, including an in-vehicle camera and the like, that obtains the state of occupant of the vehicle 1, (6) a driving operation sensor 206 that detects the driving operation of the driver, and (7) a sensor 211 (referred to below as a keyless sensor 211) that operates a keyless device. The driving operation sensor 206 includes, for example, an accelerator position sensor, a steering angle sensor, a brake hydraulic sensor, and the like. The keyless sensor 211 includes, for example, a receiving device that receives an unlocking-locking signal from a keyless remote controller 80 and a motion sensor that detects that the driver holding the key has approached the sensor or touched the doorknob. In addition, the sensor devices 200 include switches that detect operations by the occupant. The switches include, for example, a door open-close switch 212 for the occupant to open and close an electric door, a switch for operating an electric power window, a washer level switch, a hood switch, and the like.

The signal receiving devices include receiving devices that receive signals from, for example, external networks or other vehicles.

<Actuators>

The actuators 300 include a drive system actuator, a steering system actuator, a braking system actuator, and the like. Examples of the drive system actuator include an engine, a transmission, and a motor. An example of the braking system actuator is a brake. An example of the steering system actuator is a steering. In addition, the actuators 300 include, for example, a door lock device 301 that locks a side door, a door open-close device 302 that electrically opens and closes the door, a lighting control device 310 that controls the lighting of headlights FL, and an airbag device 311, and an acoustic device 312, and the like.

[Central Controller]

As illustrated in FIG. 2, the central controller 10 includes a CPU 100, a memory 160, and a connection unit 170. The central controller 10 may include a single IC (integrated circuit) or a plurality of ICs.

The central controller 10 can mutually communicate with the individual zone ECUs 40 via the in-vehicle network CNW. As mentioned above, the in-vehicle equipment 20 is connected to each of the zone ECUs 40. That is, the central controller 10 is electrically connected to the actuators 300, the sensor devices 200, and the like. Then, the central controller 10 controls the actuators 300 and the individual portions of the vehicle control system based on, for example, the information obtained by the sensor devices 200.

<CPU>

The CPU 100 performs various types of processing by reading programs from the memory 160 and executing the programs. Specifically, the CPU 100 reads, for example, the detection data detected by the sensor devices 200, performs various types of arithmetic processing to achieve various functions, and generates and outputs control signals for controlling the actuators 300. The CPU 100 may be achieved by a microcomputer or an SoC (system-on-chip).

—Hardware—

The CPU 100 includes, as hardware components, an arithmetic processing unit that performs various types of arithmetic processing according to programs stored in the memory 160 and the connection unit 170.

The connection unit 170 has a plurality of communication ports (not illustrated) to which the CAN buses constituting the in-vehicle network CNW can be connected. In the example in FIG. 2, a CAN bus L1 for connecting to the first zone ECU 41, a CAN bus L5 for connecting to the zone ECU 40 disposed in the left front zone, and a CAN bus L7 for connecting to the zone ECU 40 disposed in the right front zone, and a CAN bus L4 for connecting to the zone ECU 40 disposed in the right side zone are connected to the connection unit 170. That is, the central controller 10 is connected to the four zone ECUs 40 in the in-vehicle network CNW. The connection unit 170 has a function as a front-end circuit for bidirectional communication with the zone ECUs 40 and includes, for example, an analog-digital conversion circuit, a driver circuit, a receiver circuit, and the like. It should be noted here that the number of zone ECUs 40 connected to the central controller 10 is not particularly limited.

—Software—

The CPU 100 includes, as software components, a topmost application layer 110, a runtime environment 140 below the application layer 110, and a device driver layer 150 below the runtime environment 140. The CPU 100 may adopt a software structure compliant with so-called AUTOSAR. In this case, the application layer 110 corresponds to the application layer of AUTOSAR and includes, for example, one or more SWC (software component) modules. The runtime environment 140 corresponds to the RTE of AUTOSAR. The device driver layer 150 corresponds to BSW (basic software) including the complex driver and the MCAL (microcontroller abstraction layer) of AUTOSAR.

<Application Layer>

An application 111 for achieving various functions of the in-vehicle equipment 20 is implemented in the application layer 110. The application 111 includes a vehicle exterior environment recognition module 113, a driving operation recognition module 114, a vehicle behavior estimation module 115, an occupant state estimation module 116, and a travel control module 120.

<Vehicle Exterior Environment Recognition Module>

The vehicle exterior environment recognition module 113 recognizes the external environment of the vehicle based on the outputs of the plurality of cameras 201, the outputs of the plurality of radars 202, the output of the position sensor (not illustrated), the output of the vehicle exterior communication unit (not illustrated), and the output of the vehicle behavior estimation module 115. The vehicle exterior environment recognition module 113 is an example of the vehicle exterior environment recognition means.

For example, the vehicle exterior environment recognition module 113 generates vehicle exterior environment information indicating the external environment of the vehicle from the output described above by using a learning model generated by deep learning. In the deep learning, a multi-layer neural network (deep neural network) is used. An example of a multi-layer neural network is CNN (convolutional neural network).

Specifically, the vehicle exterior environment recognition module 113 generates two-dimensional map data representing the area in which the vehicle can move, such as a traveling road by performing image processing on the images obtained by the cameras 201. In addition, the vehicle exterior environment recognition module 113 obtains object information that is information about objects existing around the vehicle based on the detection result of the radars 202. Based on this object information, the vehicle exterior environment recognition module 113 recognizes, based on the object information, the road obstacles that may be obstruction in the processes of traveling and stopping the vehicle among the objects existing around the vehicle. Examples of objects include a moving body that is displaced over time and a stationary body that is not displaced over time. Examples of moving objects include an automobile, a motorcycle, a bicycle, and a pedestrian, and the like. Examples of stationary objects include a sign, a roadside tree, a median, a center pole, a building, and the like. In addition, the object information includes the position coordinates of an object, the speed of an object, and the like. The vehicle exterior environment recognition module 113 may obtain object information based on the images obtained by the cameras 201 in addition to or instead of the detection result of the radars 202. Then, the vehicle exterior environment recognition module 113 generates integrated map data (three-dimensional map data) representing the vehicle exterior environment by integrating the two-dimensional map data and the object information. The two-dimensional map data, the object information, and the integrated map data are examples of the vehicle exterior environment information.

<Driving Operation Recognition Module>

The driving operation recognition module 114 recognizes the driving operation applied to the vehicle based on the output of the driving operation sensor 206. For example, the driving operation recognition module 114 generates data indicating the driving operation applied to the vehicle from the output of the driving operation sensor 206 by using a learning model generated by deep learning.

<Vehicle Behavior Estimation Module>

The vehicle behavior estimation module 115 estimates the behavior of the vehicle (such as, for example, the speed, the acceleration, and the yaw rate) based on the output of the vehicle state sensors (not illustrated). For example, the vehicle behavior estimation module 115 generates data indicating the behavior of the vehicle from the output of the vehicle state sensors by using a learning model generated by deep learning.

For example, the learning model used by the vehicle behavior estimation module 115 is a vehicle six-axis model. The vehicle six-axis model is formed by modeling the accelerations in the directions of the three axes ("front and back", "left and right", and "up and down") and the angular velocity in the directions of three axes ("pitch", "roll", and "yaw") of the running vehicle. That is, the six-axis vehicle model is a numerical model that does not grasp the movement of the vehicle only on the classical vehicle motion engineering plane (only the front and back and the left and right (XY movement) movement and the yaw motion (Z-axis) of the vehicle), but reproduces the behavior of the vehicle using a total of six axes including additional three axes (pitching (Y-axis) and roll (X-axis) motions and Z-axis movement (vertical movement of the vehicle body) of the vehicle body placed on four wheels via the suspension.

<Occupant State Estimation Module>

The occupant state estimation module 116 estimates the state of the driver (for example, the health condition, the emotion, the posture, and the like of the driver) based on the output of the occupant state sensor 203. For example, the occupant state estimation module 116 generates the data indicating the behavior of the driver from the output of the occupant state sensor by using a learning model generated by deep learning. Then, the occupant state estimation module 116 detects, for example, an abnormality in the physical condition of the driver.

<Travel Control Module>

The travel control module 120 outputs control signals for controlling the actuators 300 to the individual zone ECUs 40 based on the output of the vehicle exterior environment recognition module 113, the output of the driving operation recognition module 114, the output of the vehicle behavior estimation module 115, and the output of the occupant state estimation module 116. The travel control module 120 includes a route generation module 121, a route determination module 122, a vehicle motion determination module 123, and an actuator control module.

<Route Generation Module>

The route generation module 121 generates one or more candidate routes through which the vehicle is driven to the target position that is the travel target of the vehicle based on the output of the vehicle exterior environment recognition module 113. The candidate routes are routes on which the vehicle can travel and candidates for the target route. The candidate routes include, for example, travel routes that avoid the road obstacles recognized by the vehicle exterior environment recognition module 113.

For example, the route generation module 121 generates candidate routes by using the state lattice method. The route generation module 121 sets a grid area including many grid points on the traveling road recognized by the vehicle exterior environment recognition module 113 and sets many travel routes by sequentially connecting a plurality of grid points toward the traveling direction of the vehicle. In addition, the route generation module 121 assigns route costs to the plurality of travel routes. For example, as the safety of the vehicle on a traveling route increases, the route cost assigned to the traveling route reduces. Then, the route generation module 121 selects one or more travel routes as candidate routes from the plurality of travel routes based on the route costs assigned to the plurality of travel routes.

In addition, in evacuation travel control in an emergency such as when an abnormal physical condition of the driver is detected, the route generation module 121 searches for a stop position at which the vehicle is urgently stopped, sets the stop position as the target position, and generates the evacuation route to the stop position.

<Route Determination Module>

The route determination module 122 selects the candidate route that becomes the target route from one or more candidate routes generated by the route generation module 121 based on at least one of the output of the vehicle exterior environment recognition module 113, the output of the driving operation recognition module 114, and the output of the occupant state estimation module 116. For example, the route determination module 122 selects a candidate route felt by the driver most comfortable when the driver is in a normal state (normal driving state) among a plurality of candidate routes.

In addition, the route determination module 122 selects the evacuation route generated by the route generation module 121 as the target route in evacuation travel control in an emergency such as when an abnormality in the physical condition of the driver is detected.

<Vehicle Motion Determination Module>

The vehicle motion determination module 123 determines the target motion based on the candidate route selected as the target route by the route determination module 122. This target motion is the motion of the vehicle required to travel while following the target route. In this example, the vehicle motion determination module 123 derives the target driving force, the target braking force, and the target steering amount that are the driving force, the braking force, and the steering amount for achieving the target motion, respectively. For example, the vehicle motion determination module 123 calculates the motion of the vehicle on the target route based on the vehicle six-axis model and determines the target motion based on the calculation result.

<Actuator Control Module>

The actuator control module generates control signals for controlling the actuators 300 based on the target motion determined by the vehicle motion determination module 123 and outputs the control signals to the runtime environment 140. The actuator control module includes a PT control module 124, a brake control module 125, and a steering control module 126. The PT control module 124 sends a drive command value indicating the target driving force to the actuator of the drive system. The brake control module 125 sends a braking command value indicating the target braking force to the actuator of the braking system. The steering control module 126 sends a steering command value indicating the target steering amount to the actuator of the steering system.

<Runtime Environment>

The runtime environment performs the abstraction and connection of the application 111 and the software implemented in device driver layer 150. The runtime environment may have a well-known configuration.

<Device Driver Layer>

For example, an operating system and a device driver are implemented in the device driver layer 150. The device driver includes a communication driver (not illustrated) compliant with the communication protocol of the in-vehicle network CNW. For example, when the in-vehicle network is CAN, a CAN driver is provided as a communication driver. Software to be implemented in the device driver layer 150 may have a well-known configuration.

—Memory—

The memory 160 has, as storage areas, a code area in which programs for operating the CPU 100 are stored and a rewritable data area in which data such as processing results of the CPU 100 is stored. Specifically, the code area stores programs for operating the application 111, the runtime environment, the operating system, and the device driver described above. In addition, like a memory 460 of the zone ECU 40 described later, the communication route between the application 111 and the device driver may be changed by changing the data in the data area using a mapping table provided in the data area of the memory 160.

[In-Vehicle Equipment Control Device]

The in-vehicle equipment control devices 400 are installed in the one or more zone ECUs 40. That is, the in-vehicle equipment control devices 400 may be installed in all of the zone ECUs 40 or a part of the zone ECUs 40. In addition, the in-vehicle equipment control device 400 may be installed in a dedicated ECU (not illustrated), connected downstream of the zone ECU 40, that is provided exclusively for each of the actuators. An example of the dedicated ECU is an engine drive ECU that drives the engine. The central controller 10 and each of the ECUs may include a single IC (integrated circuit) or a plurality of ICs.

FIGS. 3A and 3B are block diagrams illustrating structural examples of the in-vehicle equipment control device 400. The in-vehicle equipment control device 400 includes, for example, a CPU 450 (processor) and a memory 460. In the embodiment, it is assumed that the in-vehicle equipment control device 400 in FIG. 3A is installed in the first zone ECU 41 and the in-vehicle equipment control device 400 in FIG. 3B is installed in the second zone ECU 42. In the following descriptions, in FIG. 3A and FIG. 3B, the same components are denoted by the same reference numerals to omit duplicate descriptions and individual descriptions. In addition, when FIG. 3A and FIG. 3B are not distinguished from each other, they are often called FIG. 3 simply.

<CPU>

In both FIG. 3A and FIG. 3B, the CPU 450 performs various types of processing by reading programs 462 from the memory 460 and executing the programs 462. Specifically, for example, the CPU 450 reads the detection data detected by the sensor devices 200, performs various types of arithmetic processing to achieve various functions, and generates and outputs control signals for controlling the actuators 300. The CPU 450 is an example of the control unit. The specific aspect of the CPU 450 is not particularly limited. For example, the CPU 450 may be achieved by a microcomputer or an SoC (system-on-chip).

<Hardware>

In both FIG. 3A and FIG. 3B, the CPU 450 includes, as hardware components, an arithmetic unit that performs various types of arithmetic processing according to programs stored in the memory 460 and a peripheral function unit 480. The peripheral here refers to the in-vehicle equipment 20 used in combination with the central controller 10 and/or the zone ECUs 40.

The peripheral function unit 480 includes one or more peripheral function portions 481 for operating peripherals, that is, the in-vehicle equipment 20. As illustrated in FIG. 3, the peripheral function portions 481 include, for example, an analog-digital converter 481a (referred to below as an ADC 481a), a digital input unit 481b, a digital output unit 481c, and a PWM control unit 481d. It should be noted here that a part of the components 481a to 481d in FIG. 3 may be installed or other components may be included as the peripheral function portions 481. When the peripheral functions of the ADC 481a, the digital input unit 481b, the digital output unit 481c, and the PWM control unit 481d are not particularly distinguished in the following description, these units are simply indicated as the peripheral function portions 481.

Each of the peripheral function portions 481 has a plurality of channels. The channels are configured so that the input-output units (for example, the connectors for I/O connection) of the in-vehicle equipment 20 can be connected thereto. FIG. 3 illustrates an example in which, as the channels described above, input channels CHa1 and CHa2 are provided in the ADC 481a, input channels CHb1 and CHb2 are provided in the digital input unit 481b, output channels CHc1 and CHc2 are provided in the digital output unit 481c, and output channels CHd1 and CHd2 are provided in the PWM control unit 481d, respectively. The number of channels is not limited to two and may be three or more. In addition, the single peripheral function portion 481 may be provided with both input and output channels.

<Software>

As illustrated in FIG. 3B, the CPU 450 of the second zone ECU 42 has an application layer 420, a middleware layer 430, and a device driver layer 440 as software components. As illustrated in FIG. 3A, the CPU 450 of the first zone ECU 41 has the configuration in which the application layer 420 is omitted from the CPU 450 of the second zone ECU 42. That is, the CPU 450 of the first zone ECU 41 has the middleware layer 430 and the device driver layer 440.

In both FIG. 3A and FIG. 3B, the CPU 450 may adopt a software configuration compliant with so-called AUTOSAR. In this case, the application layer 420 in FIG. 3B corresponds to the application layer of AUTOSAR and includes, for example, one or more SWC (software component) modules. In addition, in both FIG. 3A and FIG. 3B, the device driver layer 440 and the middleware layer 430 correspond to the BSW (basic software) of AUTOSAR and the device driver layer 440 corresponds to the MCAL (microcontroller abstraction layer) of AUTOSAR. The middleware layer may be implemented as a complex driver.

In the second zone ECU 42 in FIG. 3B, an application 421 for achieving various functions for the in-vehicle equipment 20 is implemented in the application layer 420. The application 421 may have a well-known configuration. A specific example of the application 121 will be described later.

In both FIG. 3A and FIG. 3B, a device driver unit 441 that converts a software command processed by the middleware layer 430 to a hardware command is implemented in the device driver layer 440.

Individual device drivers for the peripheral function portions 481 included in the peripheral function unit 480 are implemented in the device driver unit 441. As described above, in the example in FIG. 3, the ADC 481a, the digital input unit 481b, the digital output unit 481c, and the PWM control unit 481d are included as the peripheral function portions 481. Accordingly, the device driver unit 441 includes an ADC driver 441a, which is the device driver for the ADC 481a, a DIO driver 441b, which is the device driver for the digital input unit 481b and the digital output unit 481c, and a PWM driver 441d, which is the device driver for the PWM control unit 481d. That is, the ADC driver 441a is connected to the ADC 481a, the DIO driver 441b is connected to the digital input unit 481b and the digital output unit 481c, and the PWM driver 441d is connected to the PWM control unit 481d.

In addition, the device driver unit 441 includes a communication driver 441e for connecting to the in-vehicle network CNW. The communication driver 441e is compliant with the communication protocol of the in-vehicle network CNW. For example, when the in-vehicle network is compliant with CAN, a CAN driver is provided as the communication driver 441e. The communication protocol of the in-vehicle network to which the technology of the present disclosure can be applied is not limited to CAN and may be another communication protocol such as Ethernet.

The device driver is hardware-dependent software. Generally, hardware-independent software (such as, for example, an operating system) is also implemented in the device driver layer 440.

In both FIG. 3A and FIG. 3B, a routing module 434 including one or more first communication packets 431 for exchanging data with the application 421, one or more second communication packets 432 for exchanging data with the device driver, and an external communication packet 433 for exchanging data with the in-vehicle network is implemented in the middleware layer 430.

In the example in FIG. 3, IO_1, IO_2, . . . , IO_X (X is a natural number) are implemented as the first communication packets 431. As the second communication packets 432, (1) ADC_1, ADC_2, . . . , ADC_L (L is a natural number) for exchanging data with the ADC driver 441a, (2) DI_1, DI_2, . . . , DI_M (M is a natural number) and DO_1, DO_2, . . . , DO_N (N is a natural number) for exchanging data with the DIO driver 441b, and (3) PWM_1, PWM_2, . . . , PWN_Q (Q is a natural number) for exchanging data with the PWM driver 441d are implemented. SIG_A and SIG_B are implemented as the external communication packets 433.

The external communication packet 433 has a packet structure suitable for the in-vehicle network CNW to transfer data to the in-vehicle network. For example, when the in-vehicle network CNW is CAN, the communication packets SIG_A and SIG_B can perform communication compliant with the CAN communication protocol with other zone ECUs 40 and central controllers 10 via the communication driver 441e. More specifically, the data obtained from the sensor devices 200 is subjected to size adjustment processing and data treatment processing such as format conversion to create data frames in, for example, the "standard format" or the "extended format" of CAN communication and then stored in the communication packets SIG_A and SIG_B. In addition, when receiving a signal via the CAN bus L, the communication packets SIG_A and SIG_B perform data obtainment processing that extracts information necessary to operate the actuators 300 from the data frame and send the information to the communication packet IO. For example, the size adjustment processing, the data treatment processing, and/or the data obtainment processing described above may be defined in a code area 461 or may be stored in a data area 465 in a rewritable format or the like.

In one aspect, the following connection relationships can be assumed in FIG. 3. The communication packet ADC_1 is connected to the channel CHa1 of the ADC 481*a* and the communication packet ADC_2 is connected to the channel CHa2 of ADC 481*a*. The communication packet DI_1 is connected to the channel CHb1 of the digital input unit 481*b* and the communication packet DI_2 is connected to the channel CHb2 of the digital input unit 481*b*. The communication packet DO_1 is connected to the channel CHc1 of the digital output unit 481*c* and the communication packet DO_2 is connected to the channel CHc2 of the digital output unit 481*c*. The communication packet PWM_1 is connected to the channel CHd1 of the PWM control unit 481*d* and the communication packet PWM_2 is connected to the channel CHd2 of the PWM control unit 481*d*.

The routing module 434 generates a communication route between the communication packets in the routing module 434 based on the mapping module of the module selected by a selection module 468 among the first route module 466 and the second route module 467 stored in the memory 460. An example of generating individual communication routes will be described later.

A runtime environment (RTE) may be implemented between the application layer 420 and the routing module 434 in the middleware layer 430 in FIG. 3B. The runtime environment performs the abstraction of the application 421 and the software implemented in the device driver layer 440 and connects them.

<Memory>

In both FIG. 3A and FIG. 3B, the memory 460 includes, as storage areas, the code area 461 in which the programs 462 for operating the CPU 450 are stored and the rewritable data area 465 in which processing results of the CPU 450 and the data of the first route module 466, the second route module 467, the selection module 468, and the like is stored.

<Code Area>

In the code area, for example, the programs 462 created in advance at the design stage of the in-vehicle equipment control device 400 are compiled and implemented. For example, in the case in FIG. 3A, the code area 461 of the first zone ECU 41 stores the basic framework of the routing module 434 and the programs 462 that constitute the individual drivers of the device driver unit 441. For example, in the case in FIG. 3B, the code area 461 of the second zone ECU 42 stores the programs 462 for operating the application 421 of the second zone ECU 42. In addition, programs similar to those in the code area 461 of the first zone ECU 41 are stored as the programs 462 of the second zone ECU 42.

<Data Area>

As described above, the data area 465 stores the data including the first route module 466, the second route module 467, and the selection module 468.

The first route module 466 is the module that defines the mutual connection relationships between the first communication packets 431, the second communication packets 432, and/or the external communication packet 433. In the examples in FIG. 3A and FIG. 3B, the first route module 466 is the module that outputs the communication data output from the sensor device 200 to the communication driver 441*e* as is. Specifically, the first route module 466 includes a mapping module 466*a* that defines the mutual connection relationships between the first communication packets 431, the second communication packets 432, and/or the external communication packet 433.

The second route module 467 is the module that defines the mutual connection relationships between the first communication packets 431, the second communication packets 432, and/or the external communication packet 433. In addition, in the examples in FIG. 3A and FIG. 3B, the second route module 467 performs predetermined processing on the communication data output from the sensor device 200 and outputs the communication data. The content of the predetermined processing is not particularly limited. For example, the predetermined processing includes filter processing for communication data and physical quantity conversion processing for converting the physical quantity of communication data to a different physical quantity. The predetermined processing is performed by the treatment modules stored in the data area 465. In the examples in FIG. 3A and FIG. 3B, examples including a physical quantity conversion module 467*b* and a filter module 467*c* as the treatment modules described above are illustrated.

The physical quantity conversion module 467*b* converts the physical quantity data included in the data transmitted through the communication route generated by the mapping module 467*a* according to a physical quantity conversion rule. In the example in FIG. 3A, the physical quantity conversion module 467*b* converts the physical quantity of the data transmitted between the communication packet ADC_1 and the communication packet IO_1. In addition, the physical quantity conversion module 467*b* does not convert the physical quantity of the data transmitted between the communication packet DI_2 and the communication packet IO_2. Although the method of applying the physical quantity conversion module 467*b* is not particularly limited, for example, as illustrated in FIG. 3A, the communication data is passed from the mapping module 467*a* to the physical quantity conversion module 467*b*, and the physical quantity data included in the communication data is subjected to the computation that follows the physical quantity conversion rule in the physical quantity conversion module 467*b*.

The filter module 467*c* performs predetermined filter processing on the communication data transmitted through the communication route generated by the mapping module 467*a*. The content of the filter processing is not particularly limited, but the filter processing includes, for example, noise removal processing for removing the noise in a predetermined frequency range and the noise satisfying a predetermined condition, signal thinning-out processing, and the like.

In addition, the second route module 467 includes the mapping module 467*a* that defines the mutual connection relationships between the first communication packets 431, the second communication packets 432, and/or the external communication packet 433. The mapping module 467*a* has a function of defining the communication data that passes through the treatment module in addition to defining the connection relationships described above. An example of generating individual communication routes and an operation including a treatment module will be described in "Example of operation of in-vehicle equipment control device" below. Although the method of applying the filter module 467*c* is not particularly limited, for example, as illustrated in FIG. 3A, the communication data may be passed from the physical quantity conversion module 467*b* to the filter module 467*c* so as to perform filter processing on the communication data or the communication data may be passed from the mapping module 467*a* to the filter module 467c. In the filter module 467c, the computation that follows the filtering rule in the filter module 467c is applied.

[Example of Operation of in-Vehicle Equipment Control Device]

Next, an example of the operation of the in-vehicle equipment control device 400 will be described with reference to FIGS. 3A and 3B. As described above, it is assumed that the in-vehicle equipment control device 400 in FIG. 3A is installed in the first zone ECU 41 and the in-vehicle equipment control device 400 in FIG. 3B is installed in the second zone ECU 42.

In this operation example, the communication packet SIG_A of the first zone ECU 41 is configured so that communication packets can be sent to and received from the central controller 10 via the in-vehicle network CNW. The communication packet SIG_B of the first zone ECU 41 is configured so that communication packets can be sent to and received from the communication packet SIG_A of the second zone ECU 42 via the in-vehicle network CNW. Well-known technology can be applied to bidirectional communication (transmission and reception of data therebetween) that uses the communication packets SIG_A and SIG_B. Specifically, for example, when the in-vehicle network is CAN communication, a communication packet is periodically sent regardless of the presence or absence of data or a communication packet is sent in response to a predetermined trigger. The communication packets SIG_A and SIG_B described above can support both of them and have the structure that supports such packet communication.

In addition, in this operation example, the first zone ECU 41 does not use the outputs of the cameras 201 and the keyless sensor 211. Accordingly, the code area 461 of the first zone ECU 41 does not include the processing related to the control of the actuators 300 based on the cameras 201 and the keyless sensor 211. In addition, the code area 461 of the second zone ECU 42 does not include the processing related to the door lock device 301.

The sensor devices 200 and the actuators 300 disposed mainly in the left-side zone of the vehicle 1 are connected to the first zone ECU 41. In the example in FIG. 1, the camera 201 that takes an image on the left side of the vehicle, the keyless sensor 211, the door open-close switch 212, the air bag device 311, and the acoustic device 312 are connected to the first zone ECU 41. As illustrated in FIG. 3A, the cameras 201 are connected to the channel CHa1 of the ADC 481a and the keyless sensor 211 is connected to the channel CHa2 of the digital input unit 481b. In FIG. 3A, the door open-close switch 212, the air bag device 311, and the acoustic device 312 are not illustrated.

The sensor devices 200 and the actuators 300 disposed mainly in the left rear zone of the vehicle 1 are connected to the second zone ECU 42. In the example in FIG. 1, the radar 202 for detecting obstacles on the left side behind the vehicle, the door lock device 301 for locking the left-side door, the door open-close device 302 for automatically opening and closing the left-side door, and the acoustic device 312 are connected to the second zone ECU 42. As illustrated in FIG. 3B, the door lock device 301 is connected to the channel CHc1 of the digital output unit 481c, and the door open-close device 302 is connected to the channel CHd1 of the PWM control unit 481d. In FIG. 3B, the radar 202 and the acoustic device 312 are not illustrated.

First, the processing of the image taken by the camera 201 in the first zone ECU 41 in FIG. 3A will be described. When the image signal captured by the camera 201 is received by the ADC 481a, the image signal is sent to the routing module 434 as the communication packet ADC_1 via the ADC driver 441a. In the selection module 468 of the first zone ECU 41, the second route module 467 is selected. Accordingly, in the first zone ECU 41, the mapping module 467a of the second route module 467 is applied as the routing module 434.

In the mapping module 467a of the first zone ECU 41, the communication packet ADC_1 is sent to the filter module 467c and subjected to predetermined filtering processing. The communication packet ADC_1 is sent to the physical quantity conversion module 467b upon completion of the filtering processing and subjected to the conversion processing based on the physical quantity conversion rule. For example, it is assumed that the physical quantity conversion module 467b stores the arithmetic expression "D×2−1" as the physical quantity conversion rule. Then, the physical quantity conversion module 467b performs the conversion operation "D×2−1" on the physical quantity included in the communication packet ADC_1. The result of the conversion operation is sent to the communication packet SIG_A via the communication packet IO_1. As described above, the communication packet SIG_A of the first zone ECU 41 is sent to the connection unit 170 of the central controller 10 via the communication driver 441e. Then, in the central controller 10, the image information of the camera 201 received from the first zone ECU 41 is input to the vehicle exterior environment recognition module 113 and used to generate the external environment information described above. When, for example, the image signal output from the camera 201 is sent to the central controller 10 as is in the configuration in FIG. 3A, the first route module 466 is preferably selected in the selection module 468. As described above, by changing the root module to be applied in the selection module 468, it is possible to select whether predetermined treatment processing is performed. This can select whether the data is treated without changing the code area, so the man-hours of software development can be significantly reduced.

Next, the read processing of the keyless sensor 211 in the first zone ECU 41 in FIG. 3A will be described. When the detection signal from the keyless sensor 211 is received through the channel CHb2, the detection signal is sent to the routing module 434 as communication packet DI_2 via the digital input unit 481b and the DIO driver 441b. In the routing module 434, the mapping module 467a of the second route module 467 is applied.

In the mapping module 467a, the communication packet DI_2 is sent to the communication packet IO_2. Then, the communication packet IO_2 is sent to the communication packet SIG_B. As described above, the communication packet SIG_B of the first zone ECU 41 sends data to the communication packet SIG_A of the second zone ECU 42 via the communication driver 441e.

In this way, even when an application is not provided in the first zone ECU 41, the image signal taken by the camera 201 is sent to the central controller 10 and the detection signal of the keyless sensor 211 is sent to the second zone ECU 42.

When the detection signal of the keyless sensor 211 is received from the first zone ECU 41 in the second zone ECU in FIG. 3B, the received signal is stored in the communication packet SIG_A via the communication driver 441e. In the selection module 468 of the second zone ECU 42, the first route module 466 is selected. Accordingly, in the second zone ECU 42, the mapping module 466a of the first route module 466 is applied as the routing module 434.

When the mapping module 466a of the second zone ECU 42 is applied, the communication packet SIG_A is sent to the communication packet IO_1 and the communication packet IO_1 is sent to the communication packet DO_1 via the communication packet IO_3. The communication packet DO_1 is output to the door lock device 301 via the DIO driver 441b and the channel CHc1 of the digital output unit 481c. Then, the door lock device 301 performs the lock-unlock processing of the door lock device 301 based on the output signal from the keyless sensor 211. As described above, the detection signal of the keyless sensor 211 connected to the first zone ECU 41 is transmitted to the door lock device 301 without passing through the application 421 of the second zone ECU 42 and the lock-unlock processing of the door lock device 301 is performed.

As described above, according to the embodiment, when, for example, the data obtained by the in-vehicle equipment (for example, the sensor devices 200) connected to the first zone ECU 41 is used by another zone ECU 40 (for example, the second zone ECU 42) connected via the in-vehicle network CNW, the first zone ECU 41 can send the data to the in-vehicle network CNW without any treatment by the program codes of the application. In addition, when the data detected by the first zone ECU 41 connected via the in-vehicle network CNW is used in the second zone ECU, the application 421 does not need to be executed. This can simplify the design process and the verification process of software and significantly reduce the man-hours of software development. In addition, since data can be exchanged between zone ECUs 40 without intervention of the application 421, the processing speed of the in-vehicle equipment control device 400 can be improved.

In addition, for example, when treatment processing is applied to the detection signal of the keyless sensor 211 in the second zone ECU 42, the second root module 467 only needs to be selected in the selection module 468 so that the treatment module is applied. Accordingly, when the data of another zone ECU40 is used, even if the predetermined treatment processing is required, the API function program for data exchange for each application is not required and application 421 does not need to be executed for the treatment processing. As in the above case, this can significantly reduce the man-hours of software development and improve the processing speed of the in-vehicle equipment control device 400.

Furthermore, in the above embodiment, a plurality of zones is defined in the vehicle, one zone ECU 40 is provided for each of the zones, and the central controller 10 for centrally controlling the zone ECUs 40 is provided. As described above, in the zone ECU 40, it is possible to select whether the communication data is output to another zone ECU as is or the communication data is subjected to the predetermined processing and then output by changing the setting of the selection module 468. That is, according to the structure of the embodiment, it is possible to select whether predetermined arithmetic processing or treatment processing is performed according to the type of communication data output from the sensor device 200. This can optimize the data to be transmitted to the in-vehicle network CNW. In addition, the processing can be fully completed between the zone ECUs 40 without intervention of the central controller 10. This can reduce the processing load on the central controller 10. In addition, since the amount of data to be transmitted to the in-vehicle network CNW can be reduced, the communication congestion in the in-vehicle network CNW can be relieved. The zone ECU 40 here is an example of the control unit.

The type of communication data here is not particularly limited. In the above embodiment, for example, when the data capacity of the image data output from the camera 201 is large, the data capacity can be reduced by applying predetermined filter processing and then the data is transmitted to the in-vehicle network CNW. Alternatively, when the data capacity is small as in the case of the detection signal of the keyless sensor 211, the data can be transmitted to the in-vehicle network CNW as is. At this time, it is not necessary to prepare a dedicated application or change the prepared application.

The technology disclosed herein is not limited to the embodiment described above and can be applied to another embodiment without departing from the spirit of the claims. In addition, the embodiment described above is only an example and the scope of the present disclosure should not be understood in a limited manner. The scope of the present disclosure is defined by the claims and all modifications and changes belonging to the equivalent scope of the claims fall within the scope of the present disclosure.

For example, in FIG. 3B above, the application 421 of the second zone ECU 42 may control the opening and closing of the left-side door by using the detection result of the keyless sensor 211 in the first zone ECU 41. That is, the code area 461 of the second zone ECU 42 may store, as programs for the application 421, the program for obtaining the input data of the detection result of the keyless sensor 211 via the communication packet IO_1 and the control program for controlling the door open-close device 302 via the communication packet IO_X based on the input data.

INDUSTRIAL APPLICABILITY

The technology disclosed herein is useful in designing in-vehicle equipment control devices.

What is claimed is:

1. An in-vehicle equipment control device for a vehicle having a plurality of sensors and a plurality of devices, the in-vehicle equipment control device comprising:
 circuitry configured to receive outputs from the plurality of sensors and output control signals based on the outputs from the plurality of sensors to the plurality of devices,
 wherein the circuitry includes, as software components,
  a device driver layer having a hardware abstraction function and a device driver thereof, and
  a middleware layer provided above the device driver layer,
  wherein the middleware layer includes a routing module configured to select whether communication data output from the plurality of sensors is output as is or the communication data is subjected to predetermined processing and then output according to a type of the communication data, and
  a treatment module configured to perform the predetermined processing on the communication data, and
  wherein the routing module is configured to output the communication data to the device driver;
 a keyless sensor disposed in a first portion of the vehicle, wherein the keyless sensor is connected to a first zone electronic control unit (ECU); and
 a door lock device disposed in a second portion of the vehicle, wherein the door lock device is connected to a second zone ECU, wherein a detection signal of the keyless sensor connected to the first zone ECU is transmitted to the door lock device without passing through an application of the second zone ECU, wherein the door lock device is configured to perform a lock-unlock processing of the door lock device based on an output signal from the keyless sensor.

2. The in-vehicle equipment control device according to claim 1,
wherein the treatment module includes a filter module configured to perform filter processing on the communication data, and
a conversion module configured to perform conversion processing for conversion of a physical quantity of the communication data to a different physical quantity, and
wherein the predetermined processing includes the filter processing by the filter module and the conversion processing for conversion to the different physical quantity by the conversion module.

3. The in-vehicle equipment control device according to claim 2, further comprising:
a central controller configured to centrally control a plurality of control units provided in the vehicle, the circuitry being one of the plurality of control units,
wherein the routing module is configured to select a communication route through which the communication data is output to the devices without being sent to the central controller.

4. The in-vehicle equipment control device according to claim 1, further comprising:
a central controller configured to centrally control a plurality of control units provided in the vehicle, the circuitry being one of the plurality of control units,
wherein the routing module is configured to select a communication route through which the communication data is output to the devices without being sent to the central controller.

5. The in-vehicle equipment control device according to claim 1, wherein in response to data obtained by the in-vehicle equipment connected to a first zone electronic control unit (ECU) being used by a second zone ECU connected via an in-vehicle network, the first zone ECU is configured to send the data to the in-vehicle network without any treatment by an application of the second zone ECU.

6. The in-vehicle equipment control device according to claim 5, wherein in response to data detected by the first zone ECU connected via the in-vehicle network being used in the second zone ECU, the application of the second zone ECU is not executed.

7. The in-vehicle equipment control device according to claim 1, wherein the first portion of the vehicle is a left front zone of the vehicle.

8. The in-vehicle equipment control device according to claim 1, wherein the second portion of the vehicle is a left rear zone of the vehicle.

9. A vehicle, comprising:
a plurality of sensors;
a plurality of actuators;
an in-vehicle equipment control device, the in-vehicle equipment control device including circuitry configured to
receive outputs from the plurality of sensors, and output control signals based on the outputs from the sensors to the actuators,
wherein the circuitry includes, as software components,
a device driver layer having a hardware abstraction function and a device driver thereof, and
a middleware layer provided above the device driver layer, wherein the middleware layer includes a routing module configured to select whether communication data output from the sensors is output as is or the communication data is subjected to predetermined processing and then output according to a type of the communication data, and
a treatment module configured to perform the predetermined processing on the communication data, and
wherein the routing module is configured to output the communication data to the device driver;
a keyless sensor disposed in a first portion of the vehicle, wherein the keyless sensor is connected to a first zone electronic control unit (ECU); and
a door lock device disposed in a second portion of the vehicle, wherein the door lock device is connected to a second zone ECU, wherein a detection signal of the keyless sensor connected to the first zone ECU is transmitted to the door lock device without passing through an application of the second zone ECU, wherein the door lock device is configured to
perform a lock-unlock processing of the door lock device based on an output signal from the keyless sensor.

10. The vehicle of claim 9,
wherein the treatment module includes a filter module configured to perform filter processing on the communication data, and
a conversion module configured to perform conversion processing for conversion of a physical quantity of the communication data to a different physical quantity, and
wherein the predetermined processing includes the filter processing by the filter module and the conversion processing for conversion to the different physical quantity by the conversion module.

11. The vehicle of claim 10, wherein the in-vehicle equipment control device further includes
a central controller configured to centrally control a plurality of control units provided in the vehicle, the circuitry being one of the plurality of control units,
wherein the routing module is configured to select a communication route through which the communication data is output to the devices without being sent to the central controller.

12. The vehicle of claim 9, wherein the in-vehicle equipment control device further includes
a central controller configured to centrally control a plurality of control units provided in the vehicle, the circuitry being one of the plurality of control units,
wherein the routing module is configured to select a communication route through which the communication data is output to the devices without being sent to the central controller.

13. The vehicle of claim 9, wherein in response to data obtained by the in-vehicle equipment connected to a first zone electronic control unit (ECU) being used by a second zone ECU connected via an in-vehicle network, the first zone ECU is configured to send the data to the in-vehicle network without any treatment by an application of the second zone ECU.

14. The vehicle of claim 13, wherein in response to data detected by the first zone ECU connected via the in-vehicle network being used in the second zone ECU, the application of the second zone ECU is not executed.

15. The vehicle of claim 9, wherein the first portion of the vehicle is a left front zone of the vehicle.

16. The vehicle of claim 9, wherein the second portion of the vehicle is a left rear zone of the vehicle.

17. A non-transitory computer-readable medium including computer program instructions, which when executed by an information processing system, cause the system to:
receive outputs from a plurality of sensors,
output controls signals based on the outputs from the plurality sensors to a plurality of actuators,
select whether communication data output from the plurality of sensors is output as is or the communication data is subjected to predetermined processing and then output according to a type of the communication data,
perform the predetermined processing on the communication data, and
output the communication data to a device driver, and
perform, based on an output signal from a keyless sensor, a lock-unlocking processing of a door lock device disposed in a second portion of a vehicle, wherein the door lock device is connected to a second zone ECU, wherein a detection signal of the keyless sensor in a first portion of the vehicle connected to a first zone ECU is transmitted to the door lock device without passing through an application of the second zone ECU.

* * * * *